(12) United States Patent
Mueller et al.

(10) Patent No.: US 9,118,268 B2
(45) Date of Patent: Aug. 25, 2015

(54) ELECTRONIC COMMUTATION METHOD IN DIRECT CURRENT ELECTRIC MOTORS

(75) Inventors: Andreas Mueller, Eberdingen (DE); Ingo Dwertmann, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 14/131,002

(22) PCT Filed: Jul. 7, 2011

(86) PCT No.: PCT/EP2011/061504
§ 371 (c)(1),
(2), (4) Date: Jan. 6, 2014

(87) PCT Pub. No.: WO2013/004311
PCT Pub. Date: Jan. 10, 2013

(65) Prior Publication Data
US 2014/0152222 A1    Jun. 5, 2014

(51) Int. Cl.
*H02P 6/00* (2006.01)
*H02P 6/14* (2006.01)
*H02P 6/18* (2006.01)
*H02P 25/02* (2006.01)

(52) U.S. Cl.
CPC ............... *H02P 6/002* (2013.01); *H02P 6/142* (2013.01); *H02P 6/182* (2013.01); *H02P 25/023* (2013.01)

(58) Field of Classification Search
CPC ...................................... H02P 6/002
USPC ............. 318/400.35, 400.34, 400.32, 400.01, 318/700
See application file for complete search history.

(56) References Cited

U.S. PATENT DOCUMENTS

| | | | |
|---|---|---|---|
| 5,929,577 A | 7/1999 | Neidorff et al. | |
| 6,380,707 B1 * | 4/2002 | Rosholm et al. | 318/400.03 |
| 2008/0252240 A1 | 10/2008 | Sugie | |

FOREIGN PATENT DOCUMENTS

| | | |
|---|---|---|
| CN | 101699757 | 4/2010 |
| DE | 102004005521 | 8/2004 |
| DE | 102005006503 | 8/2006 |
| DE | 102006026560 | 12/2007 |
| EP | 2037567 | 3/2009 |

OTHER PUBLICATIONS

International Search Report for Application No. PCT/EP2011/061504 dated Feb. 3, 2012 (English Translation, 2 pages).

* cited by examiner

*Primary Examiner* — David S Luo
(74) *Attorney, Agent, or Firm* — Michael Best & Friedrich LLP

(57) ABSTRACT

In an electronic commutation method in direct current electric motors which are controlled by pulse width modulation of the energization which takes place periodically with positive and negative current values and intermediate energization pauses, the counter-induction voltage is measured, wherein the zero crossing of the counter-induction voltage is determined by means of the point of intersection of the envelope to the counter-induction voltage with the zero line. The pulse width modulation of the energization is changed if the zero crossing is covered by positive or negative current values of the energization.

11 Claims, 2 Drawing Sheets

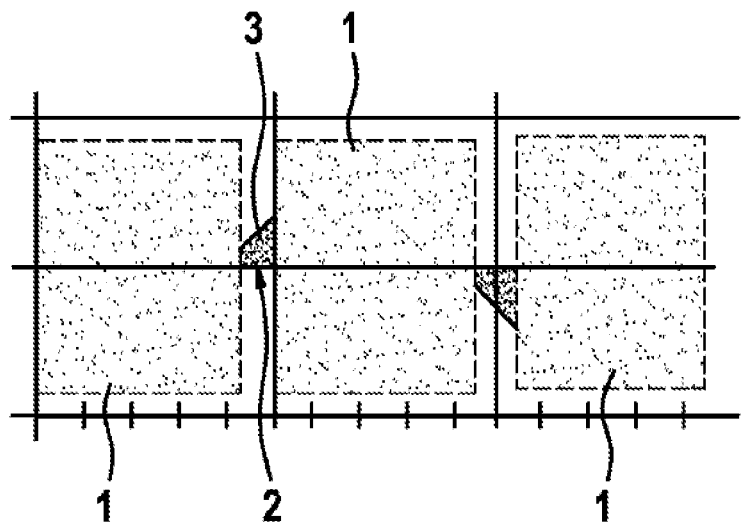
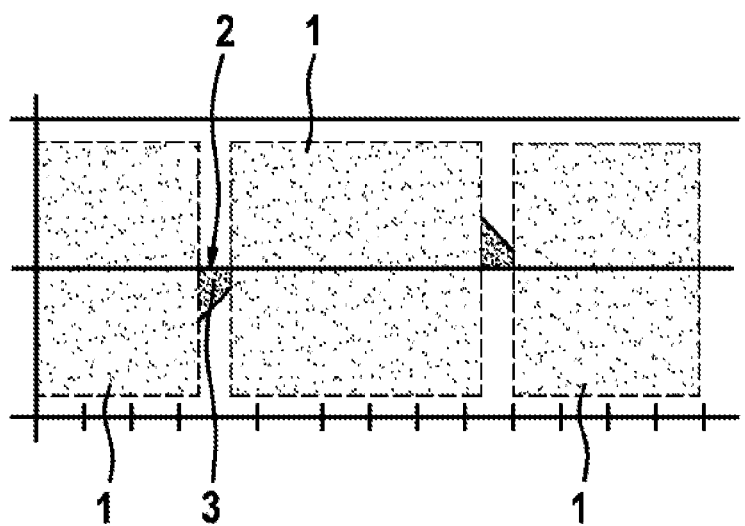

ELECTRONIC COMMUTATION METHOD IN DIRECT CURRENT ELECTRIC MOTORS

BACKGROUND OF THE INVENTION

The invention relates to an electronic commutation method in direct current electric motors.

In electronically commutated direct current electric motors, the rotating magnetic field necessary for the rotational movement is controlled by suitable electronics. The exact instants of commutation depend on the rotor position of the motor, which is either detected by means of sensors or by measuring the counter-induction voltage (back EMF) of the phase which is not energized at the time. Sensorless commutation detection can be carried out by using comparators for detecting the zero crossovers of the induced voltage and evaluating the comparator signals. It is also known to measure the induced voltage directly and to compare the measured values with a threshold about the zero crossover.

A method for measuring the current consumption of an electric motor which is supplied from a direct voltage network and controlled by pulse width modulation (PWM) is disclosed in DE 10 2005 006 503 A1. A PWM control unit supplies pulse width modulated voltage control signals for a semiconductor switching device, by means of which the current flow in the electric motor is controlled. The voltage drop, from which the motor current is inferred is measured at a measuring resistor connected in series with the semiconductor switching device.

SUMMARY OF THE INVENTION

The invention is based on the object of improving an electronic commutation method in direct current electric motors by simple measures. In particular, the sensorless commutation detection is to be independent of the actual zero crossover of the induced voltage. According to a further aspect, the energization pause between the positive or negative current values of the energization which periodically follow one another is to be minimized.

In the improved electronic commutation method, the direct current electric motors are controlled by pulse width modulation (PWM) of the energization which takes place periodically with positive and negative current values and intermediate energization pauses. The induced voltage (counter-induction voltage or back EMF) is measured synchronously with the PWM. The zero crossover of the counter-induction voltage is determined by means of the point of intersection of an envelope which is superimposed on the counter-induction voltage with the zero line. Depending on the position of the zero crossover of the counter-induction voltage, the pulse width modulation of the energization is changed, namely in those cases in which the zero crossover is covered either by the positive or by the negative current values of the energization.

In this context, zero crossover does not necessarily mean a zero potential, but also includes the crossover of the inductive voltage with mean potentials, for example, in the case of three leg voltages in the form of a star, the respective mean potential of the start point, which usually corresponds to half the supply voltage.

The basic profile of the induced voltage of the motor is known, in particular it changes at least approximately linearly, so that the envelope of the counter-induction voltage is also at least approximately a straight line. The zero crossover can therefore also be inferred from the basically known profile of the induction voltage, even when it is covered by the positive or negative current values of the energization and therefore cannot be measured directly. The parameters of the envelope, from which the zero crossover can be established by extrapolation, can be determined from the counter-induction voltage which is measured synchronously with the PWM. The envelope is preferably a straight line, wherein non-linear functions can also basically be considered.

This procedure has the advantage that an accurate measurement of the zero crossover of the induced voltage is not absolutely necessary. It is sufficient to carry out a measurement in only a small sub-region of the profile of the induced voltage, in particular over a sub-region in the energization gap, and from this to determine the zero crossover by extrapolating the envelope. In this way, the energization gap, which in principle is necessary for detecting the zero crossover, can be considerably reduced, which has positive effects on noise and powers.

A further advantage lies in that the method is considerably more robust compared with designs according to the prior art, as the absence of a commutation flank does not automatically lead to the loss of commutation itself.

When the envelope is implemented as a straight line, the zero crossover is expediently determined from the gradient of the straight line. In addition, the motor speed and the rotor angle can also be determined from the zero crossover or the gradient.

If it is established that the zero crossover is covered by the preceding energization, the energization takes place too slowly compared with the motor speed. In order to accelerate the energization, which is predetermined in the form of pulse width modulation, the increments of the pulse width modulation are adjusted to match the energization to the motor speed once more. If the zero crossover of the induced voltage is covered by the following energization, the energization takes place too quickly. In this case too, the energization is again matched to the motor speed by adjusting the increments.

In both cases, that is to say both when the energization is too slow and too fast, the zero crossover of the induced voltage is centered in the energization pause by means of the adjustment. The adjustment is carried out by changing the width of the pulse width modulation.

According to a further advantageous embodiment, it is provided that the method is used with polyphase current, wherein, in this case, the counter-induction voltage is not measured until the current in the phase under consideration falls below a limit value. The background to this is that, advantageously, the current in the respective phase is to be almost dissipated by means of the PWM profile before the measurement of the induced voltage begins, as otherwise the measurement would be falsified by the phase current which would still be flowing.

The PWM profile of the energization is sinusoidal, for example, wherein rectangular or trapezoidal or other energization forms also come into consideration. The desired energization form of a phase is stored in a table for 180°, for example, wherein a value from the table is retrieved in each PWM cycle by means of a pointer to the table and output as pulse width modulation. By incrementing the pointer, it is possible to switch to the following table values, wherein the table is processed more quickly the larger the pointer increment. Adjustment to the motor speed is possible in this way. The pointer increment increases with increasing motor speed.

The pointer is reset to the beginning of the table at the zero crossover of the induced voltage, thus achieving synchronization with the motor.

The motor speed, and therefore the pointer increment, is determined from the distance between two zero crossovers. The speed setting can be determined by scaling the table values.

BRIEF DESCRIPTION OF THE DRAWINGS

Further advantages and advantageous embodiments can be seen from the further claims, the description of the figures and the drawings. In the drawings:

FIG. 3 shows a diagram corresponding to FIG. 1 of an energization profile, in which the zero crossover of the induced voltage is covered by the preceding energization, FIG. 4 shows a further energization profile, in which the zero crossover of the induced voltage is covered by the following energization.

DETAILED DESCRIPTION

Figure 1:
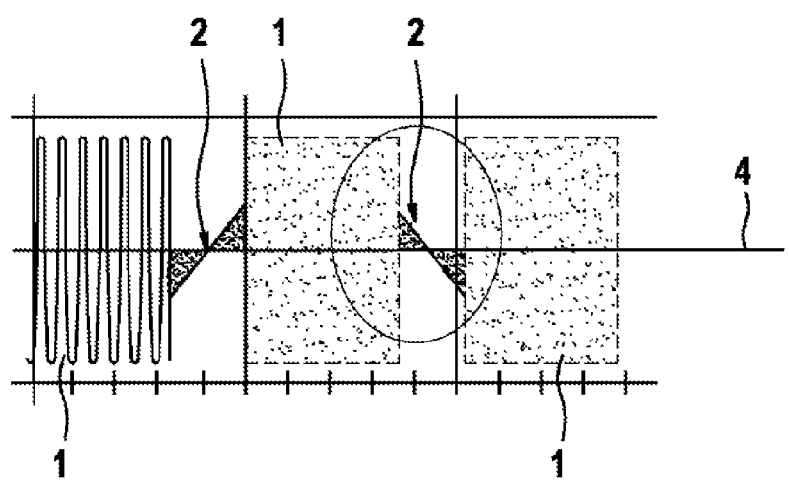
FIG. 1 shows the profile of the pulse width modulated energization of a direct current electric motor with electronic commutation, wherein a counter-induction voltage, which has a zero crossover and is measured synchronously with the PWM, lies in the intermediate energization pause between positive and negative current values.

FIG. 1 shows the profile of the energization of a direct current electric motor with electronic commutation, in which the zero crossover of the induced voltage falls exactly in the energization gap or pause between the positive or negative current values 1 with pulse width modulation (PWM) which periodically follow one another. The induced voltage 2 is the counter-induction voltage (back EMF), which is measured synchronously with the PWM. The measurement is carried out by an analog-digital converter.

The direct current electric motor is energized by means of polyphase current which is applied in particular by means of a star circuit, wherein only one phase is shown in the exemplary embodiment according to FIGS. 1 to 4. The counter-induction voltage 2 is not measured until the current in the phase has already been almost dissipated so that the current falls below a limit value. This prevents the measurement from being falsified by the phase current which is still flowing.

Figure 2:
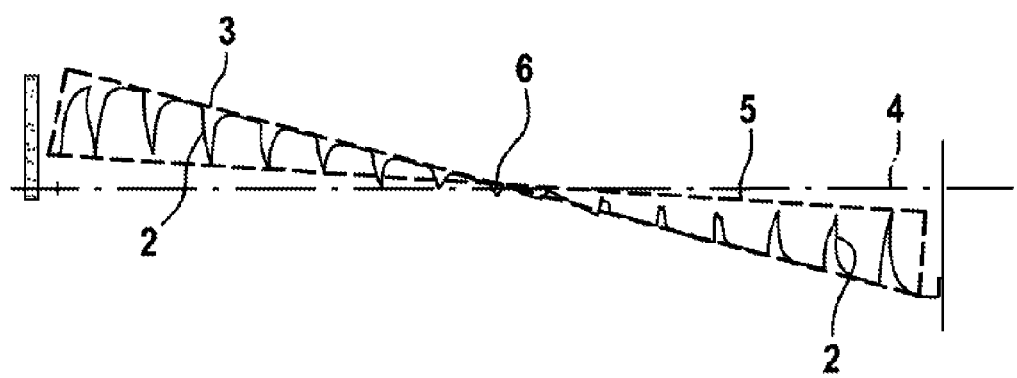
FIG. 2 shows the detail from FIG. 1 in an enlarged diagram with an envelope, which is implemented as a straight line and from which the zero crossover can be determined, superimposed on the counter-induction voltage.

As can be seen from the enlarged diagram of the counter-induction voltage 2 according to FIG. 2, the counter-induction voltage has a profile which is synchronous with the PWM, wherein an envelope 3, which forms a straight line and cuts the zero line 4, can be superimposed on the profile. Coinciding approximately with the zero line 4 is a straight line 5, which is inclined at a small angle to the zero line and forms the second envelope on the profile of the counter-induction voltage 2 on the side opposite the envelope 3. The point of intersection of the first envelope 3 with the zero line 4 is at the same time the point of intersection of the second envelope 5 with the first envelope 3.

The envelope 3 has a slope which is calculated so that the point of intersection 6 of the envelope 3 with the zero line 4 lies exactly in the center of the energization pause between two energization phases. This characterizes the normal case in which the energization matches the motor speed. The motor speed and the motor angle can also be determined from the gradient or slope of the envelope 3.

Basically, it is sufficient to measure only a partial section of the profile shown in FIG. 2 of the counter-induction voltage 2 in the energization pause between two energization phases to enable the slope of the envelope 3 to be determined. Just a few sampling points are sufficient to determine the zero crossover 6.

In the further diagrams according to FIGS. 3 and 4, the energization does not match the motor speed, wherein, according to FIG. 3, the energization takes place too slowly and, according to FIG. 4, the energization takes place too quickly. Accordingly, in the exemplary embodiment according to FIG. 3, the zero crossover of the induced voltage 2 is covered by the preceding energization, whereas in FIG. 4, the zero crossover of the induced voltage 2 is covered by the following energization. In spite of being covered, the zero crossover can be determined from the gradient of the envelope 3 by linear extrapolation. To match the energization to the motor speed, the pulse width modulation PWM of the energization is changed in such a way that the zero crossover of the counter-induction voltage 2 lies centrally in the energization pause in a similar way to the exemplary embodiment according to FIG. 1. This is achieved by adjusting the width of the pulse width modulation.

The invention claimed is:

1. An electronic commutation method in direct current electric motors which are controlled by pulse width modulation (PWM) of an energization which takes place periodically with positive and negative current values (1) and intermediate energization pauses, wherein, the counter-induction voltage (2) is measured synchronously with the PWM, characterized in that a zero crossover of the counter-induction voltage (2) is determined at a point of intersection of an envelope (3) of the counter-induction voltage (2) with a zero line (4), wherein the pulse width modulation (PWM) of the energization is changed if the zero crossover is covered by positive or negative current values of the energization.

2. The method as claimed in claim 1, characterized in that the envelope (3) of the counter-induction voltage (2) is at least approximately a straight line.

3. The method as claimed in claim 2, characterized in that the zero crossover is determined from a gradient of the straight line (5).

4. The method as claimed in claim 3, characterized in that a motor speed and a rotor angle are determined from the zero crossover or the gradient.

5. The method as claimed in claim 1, characterized in that the pulse width modulation (PWM) of the energization is changed such that the zero crossover of the counter-induction voltage (2) lies centrally in the energization pauses.

6. The method as claimed in claim 1, characterized in that the width of the pulse width modulation is adjusted.

7. The method as claimed in claim 1, characterized in that a polyphase current is used and the counter-induction voltage (2) is not measured until the current in a phase under consideration falls below a limit value.

8. The method as claimed in claim 1, characterized in that the counter-induction voltage (2) is only measured over a sub-region in the energization gap.

9. A regulator and control device for carrying out the method as claimed in claim 1.

10. An electric motor, having a regulator and control device as claimed in claim 9.

11. The electric motor as claimed in claim 10, wherein the electric motor is in a vehicle.

* * * * *